(12) United States Patent
Brokish et al.

(10) Patent No.: US 10,223,813 B2
(45) Date of Patent: Mar. 5, 2019

(54) METHOD AND SYSTEM FOR REPROJECTION AND BACKPROJECTION FOR TOMOGRAPHY RECONSTRUCTION

(71) Applicant: InstaRecon, Inc., Urbana, IL (US)

(72) Inventors: Jeffrey Brokish, Savoy, IL (US); Yoram Bresler, Urbana, IL (US)

(73) Assignee: InstaRecon, Urbana, IL (US)

( * ) Notice: Subject to any disclaimer, the term of this patent is extended or adjusted under 35 U.S.C. 154(b) by 144 days.

(21) Appl. No.: 15/233,615

(22) Filed: Aug. 10, 2016

(65) Prior Publication Data

US 2017/0046858 A1 Feb. 16, 2017

Related U.S. Application Data

(60) Provisional application No. 62/204,446, filed on Aug. 13, 2015.

(51) Int. Cl.
*G06T 11/00* (2006.01)

(52) U.S. Cl.
CPC .......... *G06T 11/006* (2013.01); *G06T 11/005* (2013.01); *G06T 11/008* (2013.01); *G06T 2207/10081* (2013.01)

(58) Field of Classification Search
CPC .... G06T 11/006; G06T 11/005; G06T 11/008; G06T 2207/10081
See application file for complete search history.

(56) References Cited

U.S. PATENT DOCUMENTS

| 722,798 | A | 3/1903 | Bellows |
| 891,380 | A | 6/1908 | Sharp |
| 8,705,691 | B2 * | 4/2014 | Loustauneau .......... A61B 6/587 378/38 |
| 2006/0193510 | A1 * | 8/2006 | Matsumoto ............. G06T 15/06 382/154 |
| 2013/0102830 | A1 * | 4/2013 | Otto ..................... A61N 5/1031 600/1 |
| 2016/0015350 | A1 * | 1/2016 | Chang .................. A61B 6/5258 250/362 |

(Continued)

OTHER PUBLICATIONS

De Man, Bruno, Basu, Samit "Distance-driven projection and backprojection in three dimensions" Phys. Med. Biol. 2004.*

(Continued)

*Primary Examiner* — Kim Y Vu
*Assistant Examiner* — Molly Delaney
(74) *Attorney, Agent, or Firm* — Greer, Burns & Crain, Ltd.; Steven P. Fallon

(57) ABSTRACT

Methods and systems for computed tomography. A subject is imaged with a divergent beam source using a plurality of source positions and a detector array comprising a plurality of detector bins to obtain a representation of the subject including a plurality of image voxels. Contribution of a voxel to a detector bin in a computed forward projection or a detector bin to a voxel in a backprojection is determined by the intensity value assigned to the voxel, or to the detector bin, respectively, multiplied by the product of an area or volume of overlap and an additional weighting factor, and the area or volume of overlap is determined by overlap of the voxel with the area or volume of the image illuminated by a ray-wedge defined by detector bin edge rays.

13 Claims, 14 Drawing Sheets

(56) References Cited

U.S. PATENT DOCUMENTS

2017/0202532 A1\* 7/2017 Goto .................. A61B 6/5294

OTHER PUBLICATIONS

Siddon, Robert L., "Fast calculation of the exact radiological path for a three-dimensional CT array", Med Phys. vol. 12, No. 2, (1985), pp. 252-255.
Long, Y., et al., "3D forward and backprojection for X-Ray CT using separable footprints," IEEE Trans. Med. Imag., vol. 29, pp. 1839-1850, 4 2010.

\* cited by examiner

| | |
|---|---|
| Accumulate along columns/rows of the image, forming $A_C[m,n], A_R[m,n]$ as in Eq. (26)<br>For each source position $\vec{S}$ | 800 |
|     Initialize $g[\vec{S},:] = 0$<br>    Denote detector bin edges $\epsilon[k]$ for $k = 0:U$<br>    Define extended detector bin edge list<br>        $\hat{\epsilon} = \{\epsilon[0], \epsilon[1], \ldots, \epsilon[K], \epsilon_D, \epsilon[K+1], \ldots, \epsilon[U]\}$<br>        where<br>            ranges $0:K$ and $K + 1:U$ denote vertical and horizontal groups (or vise-versa)<br>            $\epsilon_D$ is a diagonal ray on a 45 degree angle,<br>            $K = U$ if all rays are horizontal or vertical<br>    If $\hat{\epsilon}[0]$ is a horizontal ray<br>        $H_B = 0, H_E = K + 1, V_B = K + 1, V_E = U + 1, \lambda = 0$<br>    Else<br>        $V_B = 0, V_E = K + 1, H_B = K + 1, H_E = U + 1, \lambda = 1$ | 810 |
| If $H_B < U + 1$<br>    For each image column $m$<br>        $E[H_B] = C(f[m,:], A_C[m,:], \psi_1(\vec{S}, \hat{\epsilon}[H_B], m), \psi_2(\vec{S}, \hat{\epsilon}[H_B], m))$ as in Eq. (27)<br>        For $u \in [H_B, H_E - 1]$<br>            $E[u + 1] = C(f[m,:], A_C[m,:], \psi_1(\vec{S}, \hat{\epsilon}[u+1], m), \psi_2(\vec{S}, \hat{\epsilon}[u+1], m))$<br>            as in Eq. (27) | 820 |
|             $D[u] = E[u + 1] - E[u]$ as in Eq. (28)<br>            $g[\vec{S}, u - \lambda]\mathrel{+}= \widehat{W}(u - \lambda, m)D[u]$ as in Eq. (29) | 830 |
| If $V_B < U + 1$<br>    For each image row $n$<br>        $E[V_B] = C(f[:,n], A_R[:,n], \psi_1(\vec{S}, \hat{\epsilon}[V_B], n), \psi_2(\vec{S}, \hat{\epsilon}[V_B], n))$ as in Eq. (27)<br>        For $u \in [V_B, V_E - 1]$<br>            $E[u + 1] = C(f[:,n], A_R[:,n], \psi_1(\vec{S}, \hat{\epsilon}[u+1], n), \psi_2(\vec{S}, \hat{\epsilon}[u+1], n))$<br>            as in Eq. (27) | 840 |
|             $D[u] = E[u + 1] - E[u]$ as in Eq. (28)<br>            $g[\vec{S}, u - (1 - \lambda)]\mathrel{+}= \widehat{W}(u - (1 - \lambda), n)D[u]$ as in Eq. (29) | 850 |

FIG. 8

| | |
|---|---|
| Accumulate along column slabs/row slabs of the image, forming $A_C[m,n,p], A_R[m,n,p]$ as in Eq. (36),(37) | 1100 |
| For each source position $\vec{S}$<br>    Initialize $g[\vec{S},:,:] = 0$<br>    Denote detector column edges $\epsilon[k]$ for $k = 0: U$<br>    Define extended detector column edge list<br>        $\hat{\epsilon} = \{\epsilon[0], \epsilon[1], \ldots, \epsilon[K], \epsilon_D, \epsilon[K+1], \ldots, \epsilon[U]\}$<br>        where<br>        ranges $0: K$ and $K+1: U$ denote vertical and horizontal groups (or vise-versa)<br>        $\epsilon_D$ is a diagonal edge ray on a 45 degree in-plane angle,<br>        $K = U$ if all rays are horizontal or vertical<br>    If $\hat{\epsilon}[0]$ is a horizontal ray<br>        $H_B = 0, H_E = K+1, V_B = K+1, V_E = U+1, \lambda = 0$<br>    Else<br>        $V_B = 0, V_E = K+1, H_B = K+1, H_E = U+1, \lambda = 1$ | 1110 |
| If $H_B < U+1$<br>    For each image column slab $m$<br>        For each image slice $p$<br>            $E[H_B, p] =$<br>$C(f[m,:,p], A_C[m,:,p], \psi_1(\vec{S}, \hat{\epsilon}[H_B], m), \psi_2(\vec{S}, \hat{\epsilon}[H_B], m))$ as in Eq. (38)<br>        For $u \in [H_B, H_E - 1]$<br>            For each image slice $p$<br>                 $E[u+1, p] =$<br>$C(f[m,:,p], A_C[m,:,p], \psi_1(\vec{S}, \hat{\epsilon}[u+1], m), \psi_2(\vec{S}, \hat{\epsilon}[u+1], m))$<br>            as in Eq. (38) | 1120 |
| $D[u,p] = E[u+1,p] - E[u,p]$ as in Eq. (39) | 1130 |
| For each detector row $v$<br>    $\tilde{h}[v] = R(D[u,p], v)$ using overlap method $R$ from Eq. (47) or Eq. (49) | 1140 |
| $g[\vec{S}, u-\lambda, v] \mathrel{+}= \widetilde{W}(u-\lambda, v)\tilde{h}[v]$ as in Eq. (48) | 1150 |
| If $V_B < U+1$<br>    For each image row slab $n$<br>        For each image slice $p$<br>            $E[H_B, p] =$<br>$C(f[:,n,p], A_R[:,n,p], \psi_1(\vec{S}, \hat{\epsilon}[V_B], n), \psi_2(\vec{S}, \hat{\epsilon}[V_B], n))$ as in Eq. (38)<br>        For $u \in [V_B, V_E - 1]$<br>            For each image slice $p$<br>                 $E[u+1, p] =$<br>$C(f[:,n,p], A_R[:,n,p], \psi_1(\vec{S}, \hat{\epsilon}[u+1], n), \psi_2(\vec{S}, \hat{\epsilon}[u+1], n))$ as in Eq. (38) | 1160 |
| $D[u,p] = E[u+1,p] - E[u,p]$ as in Eq. (39) | 1170 |
| For each detector row $v$<br>    $\tilde{h}[v] = R(D[u,p], v)$ using overlap method $R$ from Eq. (47) or Eqs. (49) and (50) | 1180 |
| $g[\vec{S}, u-(1-\lambda), v] \mathrel{+}= \widetilde{W}(u-(1-\lambda), v)\tilde{h}[v]$ as in Eq. (48) | 1190 |

FIG. 11

| | |
|---|---|
| Initialize $f^*[:,:] = 0, A_C^*[:,:] = 0, A_R^*[:,:] = 0$ | 1200 |
| For each source position $\vec{S}$<br>    Denote detector bin edges $\epsilon[k]$ for $k = 0:U$<br>    Define extended detector bin edge list<br>        $\hat{\epsilon} = \{\epsilon[0], \epsilon[1], ..., \epsilon[K], \epsilon_D, \epsilon[K+1], ..., \epsilon[U]\}$<br>        where<br>            ranges $0: K$ and $K + 1: U$ denote vertical and horizontal groups (or vise-versa)<br>            $\epsilon_D$ is a diagonal ray on a 45 degree angle,<br>            $K = U$ if all rays are horizontal or vertical<br>    If $\hat{\epsilon}[0]$ is a horizontal ray<br>        $H_B = 0, H_E = K + 1, V_B = K + 1, V_E = U + 1, \lambda = 0$<br>    Else<br>        $V_B = 0, V_E = K + 1, H_B = K + 1, H_E = U + 1, \lambda = 1$ | 1210 |
| If $H_B < U + 1$<br>    For each image column $m$<br>        For $u \in [H_B, H_E - 1]$<br>            $D^*[u] = \widehat{W}(u - \lambda, m)g[\vec{S}, u - \lambda]$ as in Eq. (58) | 1220 |
|         For $u \in [H_B, H_E]$<br>            $E^*[u] = D^*[u-1] - D^*[u]$ as in Eq. (59) | 1230 |
|             $f^*[m,:] \mathrel{+}= C_f^*(E^*[u], \psi_1(\vec{S}, \hat{\epsilon}[u], m), \psi_2(\vec{S}, \hat{\epsilon}[u], m))$ as in Eq. (60)<br>            $A_C^*[m,:] \mathrel{+}= C_A^*(E^*[u], \psi_1(\vec{S}, \hat{\epsilon}[u], m), \psi_2(\vec{S}, \hat{\epsilon}[u], m))$ as in Eq. (61) | 1240 |
| If $V_B < U + 1$<br>    For each image row $n$<br>        For $u \in [V_B, V_E - 1]$<br>            $D^*[u] = \widehat{W}(u - (1 - \lambda), n)g[\vec{S}, u - (1 - \lambda)]$ as in Eq. (58) | 1250 |
|         For $u \in [V_B, V_E]$<br>            $E^*[u] = D^*[u-1] - D^*[u]$ as in Eq. (54) | 1260 |
|             $f^*[m,:] \mathrel{+}= C_f^*(E^*[u], \psi_1(\vec{S}, \hat{\epsilon}[u], n), \psi_2(\vec{S}, \hat{\epsilon}[u], n))$ as in Eq. (59)<br>            $A_R^*[m,:] \mathrel{+}= C_A^*(E^*[u], \psi_1(\vec{S}, \hat{\epsilon}[u], n), \psi_2(\vec{S}, \hat{\epsilon}[u], n))$ as in Eq. (60) | 1270 |
| Reverse accumulate along columns/rows of the image, forming $\hat{A}_C^*[m,n], \hat{A}_R^*[m,n]$ as in Eq. (62),(63)<br>$f[m,n] = f^*[m,n] + \hat{A}_C^*[m,n] + \hat{A}_R^*[m,n]$ as in Eq. (64) | 1280 |

| | |
|---|---|
| Initialize $f^*[:,:,:] = 0, A_C^*[:,:,:] = 0, A_R^*[:,:,:] = 0$ | 1300 |
| For each source position $\vec{S}$<br>    Denote detector column edges $\epsilon[k]$ for $k = 0:U$<br>    Define extended detector bin edge list<br>        $\hat{\epsilon} = \{\epsilon[0], \epsilon[1], \ldots, \epsilon[K], \epsilon_D, \epsilon[K+1], \ldots, \epsilon[U]\}$<br>    where<br>    ranges $0:K$ and $K+1:U$ denote vertical and horizontal groups (or vise-versa)<br>    $\epsilon_D$ is a diagonal ray on a 45 degree in –plane angle<br>    $K = U$ if all rays are horizontal or vertical<br>    If $\hat{\epsilon}[0]$ is a horizontal ray<br>        $H_B = 0, H_E = K+1, V_B = K+1, V_E = U+1, \lambda = 0$<br>    Else<br>        $V_B = 0, V_E = K+1, H_B = K+1, H_E = U+1, \lambda = 1$ | 1305 |
| If $H_B < U+1$<br>    For each image column slab $m$<br>        Initialize $D^*[:,:] = 0$<br>        For $u \in [H_B, H_E - 1]$<br>            For each detector row $v$<br>                $\tilde{h}^*[v] = \widetilde{W}(u - \lambda, v) g[\vec{S}, u - \lambda, v]$ as in Eq.(65) | 1310 |
| $D^*[u,p] \mathrel{+}=$<br>$R^*\left(\tilde{h}[v], \phi_1(u,v), \phi_2(u,v), \phi_3(u,v), \phi_4(u,v)\right)$ as in Eq. (68) using adjoint overlap method $R^*$ from Eq. (66) or Eq. (67) | 1315 |
| For $u \in [H_B, H_E]$<br>    For each image slice $p$<br>        $E^*[u] = D^*[u-1,p] - D^*[u,p]$ as in Eq. (69) | 1320 |
| $f^*[m,:,p] \mathrel{+}=$<br>$C_f^*(E^*[u], \psi_1(\vec{S}, \hat{\epsilon}[u], m), \psi_2(\vec{S}, \hat{\epsilon}[u], m))$ as in Eq. (70)<br>$A_C^*[m,:,p] \mathrel{+}=$<br>$C_A^*(E^*[u], \psi_1(\vec{S}, \hat{\epsilon}[u], m), \psi_2(\vec{S}, \hat{\epsilon}[u], m))$ as in Eq. (71) | 1325 |
| If $V_B < U+1$<br>    For each image row slab $n$<br>        Initialize $D^*[:,:] = 0$<br>        For $u \in [V_B, V_E - 1]$<br>            For each detector row $v$<br>                $\tilde{h}^*[v] =$<br>$\widetilde{W}(u - (1-\lambda), v) g[\vec{S}, u - (1-\lambda), v]$ as in Eq.(65) | 1330 |
| $D^*[u,p] \mathrel{+}=$<br>$R^*(\tilde{h}[v], \phi_1(u,v), \phi_2(u,v), \phi_3(u,v), \phi_4(u,v))$ as in Eq.(68) using adjoint overlap method $R^*$ from Eq. (66) or Eq. (67) | 1335 |
| For $u \in [V_B, V_E]$<br>    For each image slice $p$<br>        $E^*[u] = D^*[u-1,p] - D^*[u,p]$ as in Eq. (69) | 1340 |
| $f^*[:,n,p] \mathrel{+}=$<br>$C_f^*(E^*[u], \psi_1(\vec{S}, \hat{\epsilon}[u], n), \psi_2(\vec{S}, \hat{\epsilon}[u], n))$ as in Eq. (70)<br>$A_R^*[:,n,p] \mathrel{+}=$<br>$C_A^*(E^*[u], \psi_1(\vec{S}, \hat{\epsilon}[u], n), \psi_2(\vec{S}, \hat{\epsilon}[u], n))$ as in Eq. (71) | 1345 |
| Reverse accumulate along column slabs/row slabs of the image, forming $\hat{A}_C^*[m,n,p], \hat{A}_R^*[m,n,p]$ as in Eq. (67),(68)<br>$f[m,n,p] = f^*[m,n,p] + \hat{A}_C^*[m,n,p] + \hat{A}_R^*[m,n,p]$ as in Eq. (74) | 1350 |

METHOD AND SYSTEM FOR REPROJECTION AND BACKPROJECTION FOR TOMOGRAPHY RECONSTRUCTION

PRIORITY CLAIM AND REFERENCE TO RELATED APPLICATION

The application claims priority under 35 U.S.C. § 119 from prior provisional application Ser. No. 62/204,446, which was filed Aug. 13, 2015.

STATEMENT OF GOVERNMENT INTEREST

This invention was made with government support under R44EB014669 awarded by National Institutes of Health, National Center for Advancing Translational Sciences (NCATS) and National Institute of Biomedical Imaging and Bioengineering (NIBIB). The government has certain rights in the invention.

FIELD

A field of the invention is computed tomography. The invention is applicable to various computed tomography techniques, including, for example, X-ray Computed Tomography (CT), single photon emission computed tomography (SPECT), positron emission tomography (PET), synchrotron radiation, etc. Methods and systems of the invention provide the ability determine the forward projection (also known as reprojection, or x-ray transform) of a digital (discrete) image under a cone-beam imaging scenario. Methods and systems of the invention can also be used to determine the adjoint operation of forward projection, that is, backprojection.

BACKGROUND

Computed tomography techniques including X-ray Computed Tomography (CT), single photon emission computed tomography (SPECT), positron emission tomography (PET), synchrotron radiation, etc. are well-established imaging modalities. Systems using these imaging modalities (referred to as tomographic imaging systems) are used in applications such as medical, biomedical, security, and industrial, with the scanned objects being patients, small animals, material or tissue samples, pieces of luggage, or manufactured parts.

A computational process that is commonly used in tomographic imaging systems is reprojection, which, for a given two-dimension (2D) or three dimensional (3D) image, produces a set of numbers known as projections, which are closely related to the set of measurements that would be measured by a detector array in a tomographic system. Another commonly used computational process is backprojection, which is the adjoint or transpose of reprojection, and which, for a given set of projections or pre-processed projections, creates a corresponding image.

The accuracy with which the operations of reprojection and backprojection are performed affects the quality of images produced by tomographic imaging systems. Also, reprojection and backprojection are some of the most computationally demanding operations in tomographic imaging systems. For these reasons, much effort has been devoted to the development of reprojection and backprojection methods that are both accurate and computationally efficient when implemented on computers or special-purpose hardware.

The Siddon method [R. L. Siddon, "Fast calculation of the exact radiological path for a three-dimensional CT array," Med. Phys., vol. 12, no. 2, pp. 252-255, 1985] is a widely used technique for performing the reprojection operation. The method operates by tracing the x-ray trajectory from the source to the center of the detector. As it traverses the image volume, it calculates the intersection length of the ray with a given voxel as its contribution to the detector. By tracing along the ray, only the relevant voxels that contribute to a given ray are processed. Also, certain geometric calculations are made easier by continuing along the ray. However, this method only produces the 'pencil-ray' projection calculations. The pencil-ray calculations can become complex to account for voxel sizes that smaller than a detector, because voxels are evenly not passed through by the ray. Ray samples must be fine enough to ensure farthest voxels are passed through. The failure to traverse voxels can create significant artifacts. The pencil-ray calculations also do not provide projections for integrating detectors, that is, detectors that integrate the projected values over the detector element area. The pencil-ray calculations therefore fail to provide an accurate model of the physical measurements in a system with integrating detectors.

The distance-driven (DD) reprojector [B. De Man and S. Basu, "Distance-driven projection and backprojection in three dimensions," Phys. Med. Biol., vol. 49, no. 11, pp. 2463-2475, 2004] is another widely used reprojection technique. This method is attractive because it incorporates a model of the voxel's physical extent, along with integration over a detector area, and does so in a computationally efficient manner. It achieves this efficiency by effectively collapsing one of the dimensions of the image volume as it processes the data. The DD method processes the image volume in x-z or y-z slabs. However, when processing a given slab, it considers only the two dimensional x-z or y-z cross section of the voxels. The 'slant' of the rays is approximately compensated for by a $1/\cos(\alpha)$ factor (where $\alpha$ is the angle the ray makes with the slab), but as a result of this approximation, the method accuracy degrades as the ray's angle approaches 45 degrees.

A more recently proposed method is the Separable Footprint (SF) reprojector [Y. Long, J. Fessler, and J Balter, "3D Forward and Backprojection for X-Ray CT Using Separable Footprints," IEEE Trans. Med. Imag., vol 29, pp 1839-1850, 2010]. It aims to overcome the inaccuracies of the DD methods by better modeling of the physical extent of the voxel basis. Unlike the DD method, the SF method is a variant of the so-called 'splatting' techniques, which operate in the detector domain, representing the projection of the voxel with a footprint which is scaled and stretched depending on the voxel's location in the image domain. Earlier approaches to splatting used rotationally invariant footprints to ease the computational requirements of the method. The SF approach represents the footprint in a separable way, as a function of the detector rows and channels. The SF method operates on an indirect representation of the voxel in the detector domain and not upon a direct representation in the image space that accounts for the overlap of the rays and voxels.

The various reprojectors described above also have corresponding backprojection methods, with related advantages and drawbacks.

SUMMARY OF THE INVENTION

Embodiments of the invention include methods and systems for forward and back projection in computed tomagraphy. In preferred methods and systems of the invention, the contribution of a pixel or voxel to a detector bin or vice-versa is determined by the intensity value assigned to the pixel or voxel or detector bin, respectively, multiplied by the product of an area or volume of overlap and an additional weighting factor, and wherein the area or volume of overlap is determined by overlap of the pixel or voxel with the area or volume of the image illuminated by a ray-wedge defined by detector bin edge rays. In preferred embodiments, detector bin edge rays are divided into groups of horizontal and vertical rays, based on whether a given ray makes a larger angle with the first coordinate axis or second coordinate axis, and if no such ray already exists among the detector edge rays, a virtual edge ray is added which has exactly a 45 degree or −45 degree orientation with respect to the first coordinate axis and is included in both groups. In preferred embodiments, the weighting factor is approximated as a function that is independent of the image column for detector bins with horizontal edge rays, or independent of the image row for detector bins with vertical edge rays. In preferred embodiments, the weighting factor is a function of the distance from the source to the centerline of the image column or image row for horizontal and vertical detector bin edge rays, respectively, along the ray connecting the source to the center of the detector bin.

In a preferred method of the invention, a subject is imaged with a divergent beam source to obtain a representation of the subject including a plurality of image pixels or voxels. The divergent beam source is preferably a 2D fan beam or 3D cone X-ray beam. The image pixels or voxels are forward projected onto or back projected from a detector array containing a plurality of bins, or vice-versa, such that the contribution of a pixel or voxel to detector bin in the forward case or the contribution of a detector bin to a pixel or voxel in the backward case is determined by the intensity value assigned to the pixel or voxel or to the detector bin, respectively, multiplied by the product of an area or volume of overlap and an additional weighting factor, and wherein the area or volume of overlap is determined by overlap of the pixel or voxel with the area or volume of the image illuminated by a ray-wedge defined by detector bin edge rays.

A preferred method for reprojection for use in computed tomography (CT) includes imaging with a reference imaging geometry consisting of a 2D fan beam or 3D cone beam source, a plurality of detector elements on a detector array, and at least one given source position arranged to obtain discrete representation of an image including a plurality of pixels or voxels. An image is pre-accumulated along x and y directions. Detector edge rays are classified into horizontal and vertical directions for a given source positions. A horizontal cumulative area for each detector edge ray is calculated for each horizontal edge ray set. Differencing, weighting, and accumulating horizontal cumulative areas is conducted and the horizontal cumulative area operations are repeated for each image column. The cumulative area for each detector edge ray is calculated for the vertical edge set. Differencing, weighting, and accumulating horizontal cumulative areas is conducted for each image row.

A preferred method for backprojection for used in computed tomography includes initializing an image and pre-accumulated temporary images to zero; classifying detector edge rays into horizontal and vertical directions for each view; applying a weighting to the value of each detector with horizontal detector edge rays and with vertical detector edge rays; taking a difference of weighted detectors for each horizontal edge ray, updating all pixels in a current column of the image and the pre-accumulated image, and repeating for each image column; taking a difference of weighted detectors for each vertical edge ray, updating all pixels in a current row of the image and the pre-accumulated image, and repeating for each image row; repeating the classifying, applying and taking of difference steps to process the image for a given view and then repeating for other views; and reverse accumulating and adding the temporary images to an output image.

A preferred method for backprojection for use in computed tomography includes imaging a subject with a divergent beam source to obtain a representation of the subject including a plurality of image pixels or voxels. The method then includes backward projecting a plurality of detector bins onto the image pixel or voxels such that the contribution of a detector bin to a pixel or voxel is determined by the intensity value assigned to the detector bin multiplied by the product of an area or volume of overlap and an additional weighting factor, and wherein the area or volume of overlap is determined by overlap of the pixel or voxel with the area or volume illuminated by a ray-wedge defined by the source position and detector bin edge rays.

BRIEF DESCRIPTION OF THE DRAWINGS

FIG. 8 is pseudo code for implementing a 2D reprojection process in accordance with preferred methods and systems of the invention;

FIG. 11 is pseudo code for implementing a 3D reprojection process in accordance with preferred methods and systems of the invention;

FIG. 12 is pseudo code for implementing a 2D backprojection process in accordance with preferred methods and systems of the invention;

FIG. 13 is pseudo code for implementing a 3D backprojection process in accordance with preferred methods and systems of the invention.

DETAILED DESCRIPTION OF THE PREFERRED EMBODIMENTS

Figure 1:
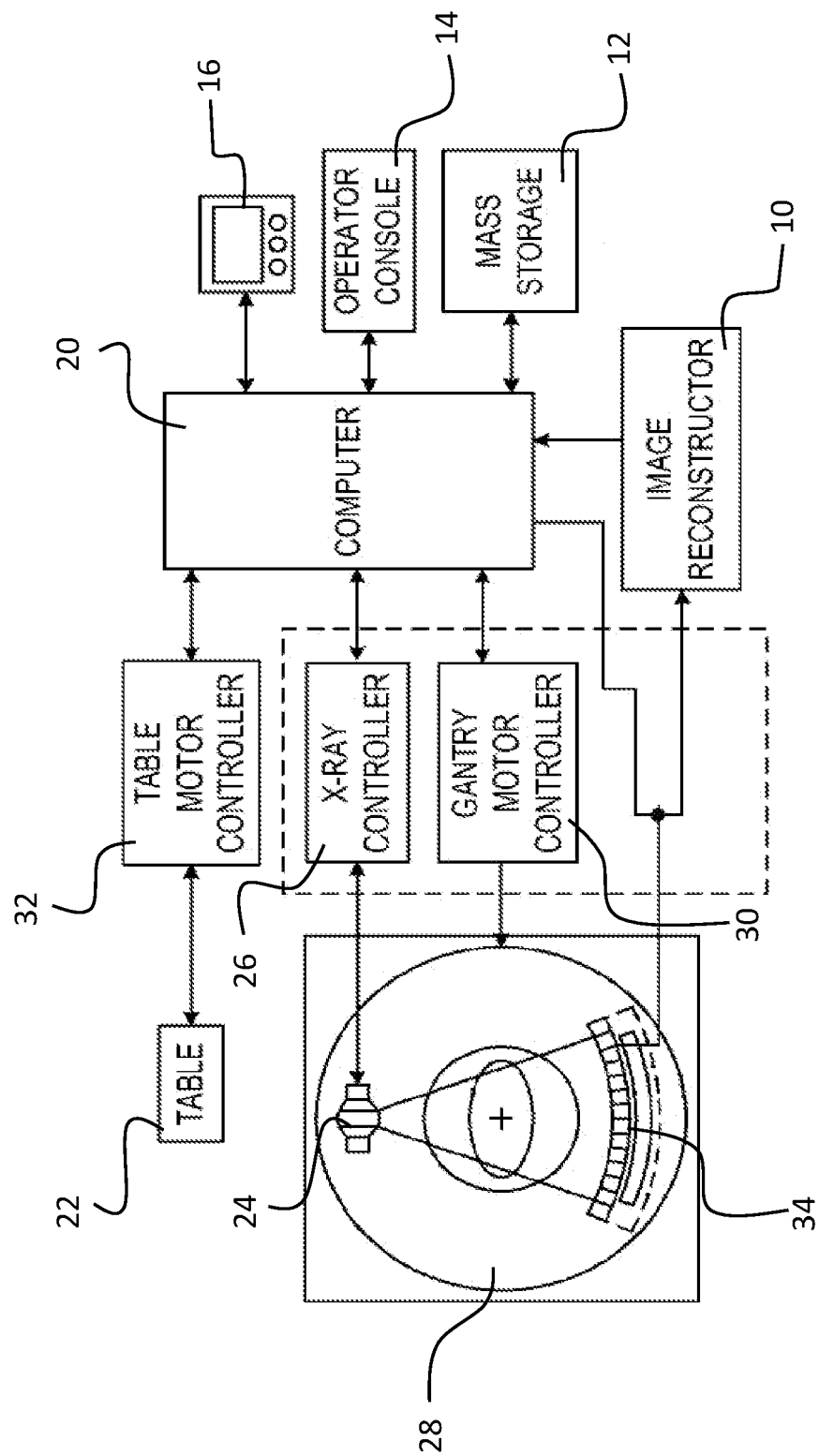
FIG. 1 is a schematic diagram of a preferred embodiment that includes the reprojection and backprojection computed tomography system of the invention.

Methods of the invention invention provide computationally efficient and accurate methods for reprojection and for backprojection that overcome drawbacks of the existing methods discussed in the background. Unlike the traditional Siddon method, which only produces the 'pencil-ray' projections, preferred methods and systems of the invention determine projections for integrating detectors. Specifically, in the invention integration of projected values over the detector element (bin) area is provided. This offers a more accurate model of the physical measurements in a system with integrating detectors.

The DD method and methods of the invention both process the image volume in x-z or y-z slabs. However, the DD method only considers the two dimensional x-z or y-z cross section of the voxels. The 'slant' of the rays is approximately compensated for by a 1/cos(α) factor (where α is the angle the ray makes with the slab), but as a result of this approximation, the method accuracy degrades as the ray's angle approaches 45 degrees. Methods of the invention model the contributions along all three dimensions and makes less severe approximations that do not degrade as the ray angles approach and surpass 45 degrees.

Unlike the SF method, which operates on a representation of the voxel in the detector domain, methods of the invention consider the overlap of the rays and voxels in image space, which is a direct representation of the physical situation in all imaging systems involving ray-matter interaction. Owing to this difference, methods of the invention can be more accurate in some applications. Methods of the invention also leverage a different access pattern to the data, and can offer computational advantages in some acquisition geometries or computational technologies used for its implementation.

Preferred embodiments can be implemented in reconfigurable hardware such as field-programmable gate array (FPGA), or special purpose hardware such as an application specific integrated circuit (ASIC), in which cases no separate storage of instructions or computer programs is required—instead the structure of the hardware (computing circuit) is adapted to execute the methods of this invention on image data fed into this hardware, which then produces the desired output in accordance with methods of the invention.

Those knowledgeable in the art will appreciate that other embodiments of the present invention lend themselves well to practice in the form of computer program products. Accordingly, it will be appreciated that embodiments of the present invention may comprise computer program products comprising computer executable instructions stored on a non-transitory computer readable medium that, when executed, cause a computer to undertake methods according to the present invention, or a computer configured to carry out such methods. The executable instructions may comprise computer program language instructions that have been compiled into a machine-readable format. The non-transitory computer-readable medium may comprise, by way of example, a magnetic, optical, signal-based, and/or circuitry medium useful for storing data. The instructions may be downloaded entirely or in part from a networked computer. Also, it will be appreciated that the term "computer" as used herein is intended to broadly refer to any machine capable of reading and executing recorded instructions. It will also be understood that results of methods of the present invention may be displayed on one or more monitors or displays (e.g., as text, graphics, charts, code, etc.), printed on suitable media, stored in appropriate memory or storage, etc.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

FIG. 1 illustrates a system of the invention that includes an image reconstructor 10 that conducts reprojection and backprojection suitable for integrating detectors and addresses overlap of rays and pixels or voxels in image space. Image data is stored in mass storage 12. An operator console 14 is used to direct system operations, and a display 16 can display reconstructed images. A computer 20 coordinates system operations and data acquisition. During operation of the system, projection data of a subject under examination lying on an imaging table 22 (schematically represented but being movable within the center of a gantry 28) is acquired by operating an X-ray source 24 under control of an X-ray controller 26 while spinning the gantry 28 under control of a gantry motor controller 30, and moving the table 22 under control of a table motor controller 32, with the controllers being coordinated by the computer 20, instructed by commands given by an operator through the operator console 14. An integrating detector array 34 detects radiation passing through the subject. Detected electrical signals at the detector are digitized and transmitted to the image reconstructor 10 and computer 20, which stores reconstructed images in mass storage 12. After preprocessing and correction, projection data are derived from the detector data and fed to an iterative reconstruction module of the image reconstructor 10. The image reconstructor 10 can be a software module implementing the method of this invention and running on the computer 20, or a separate physical device, itself a computer running the software implementing a preferred method of the invention. Alternatively, the image reconstructor can be implemented in a combination of hardware, firmware, and software, including GPUs (graphical processing units), FPGAs, ASICS, circuit boards, and various electronic or electro-optical components.

Before discussing introductory concepts and preferred methods and system for reprojection and backprojection, symbols used in the following description, drawings and in the claims will be defined. The following table defines symbols that are used.

| Symbol | Definition |
| --- | --- |
| f | Image variable - Represented by a 2D array of values defining pixels in the case of 2D imaging, or a 3D array of values defining voxels in the case of 3D imaging |
| g | A sinogram variable that is a set of measurements modeling acquisition of a set of CT data. It is a 2D array of values in the case of 2D imaging, and can be either a 2D or a 3D array of values in the case of 3D imaging |
| $\vec{s}$ | Physical position of x-ray source |
| $\vec{t}$ | Orientation of an x-ray emitted from the source and captured by the detector |

| Symbol | Definition |
| --- | --- |
| β | Basis element in the representation of the image f |
| W | Weighting function applied to the contributions of each image voxel to each detector element (bin), or of each detector element to each image voxel |
| R | Function calculating area or volume of overlap between voxel element and portion of the image volume illuminated by a particular source-detector pair. |
| A | Running accumulation of image pixels along particular image coordinates |
| C | Function calculating definite integrals over image voxels based on accumulated image A |
| φ, ψ | Intersection points of a ray with image column/row/slab |
| L | The lower (with respect to index) of two intersection points |
| H | The higher (with respect to index) of two intersection points |
| Δ | Floor (integer part) of an intersection index |
| τ | Fractional component of an intersection index, i.e. x-floor(x) |
| h | In-plane overlap calculation, applied slice-by-slice to an image volume |

The image volume (object) is denoted by f(x,y,z) or by $f(\vec{x})$ in the coordinate system (x,y,z). The location of the source in the same coordinate system is denoted by $\vec{S}$. The rays emitted by the source pass through the object and are collected on a 2D detector panel. The panel is indexed by coordinates (u,v), with the v coordinate of the detector panel being parallel to the z axis of the image volume and the u coordinate dimension of the panel being orthogonal to the v coordinate dimension. The detector panel is an array of detector elements (also called bins), whose individual signals are available at the output of the detector array. The spacings between the centers of detector elements along the two detector coordinates are denoted by $T_u$ and $T_v$, respectively. The detector panel 34 may be curved, for example as part of a cylindrical surface, as illustrated in FIG. 1, in which case the detector coordinates may be curvilinear. The forward projection g(u,v) of image f is analytically expressed as $$g(\vec{S},u,v) = \int f(\vec{S}+t\vec{l}(\vec{S},u,v)/\|\vec{l}(\vec{S},u,v)\|)dt \quad (1)$$

Here $\vec{l}(\vec{S},u,v)$, called a projection ray, is a vector pointing from the source to the center of detector element (u,v). It can be expressed in terms of in-plane (or transaxial) coordinates $l_x(\vec{S},u)$ $l_y(\vec{S},u)$ independent of v, and an axial coordinate $l_z(\vec{S}, v)$ independent of u as $$\vec{l}(\vec{S},u,v) = [l_x(\vec{S},u)l_y(\vec{S},u)l_z(\vec{S},v)] \quad (2)$$

Equation (1) calculates the so-called pencil ray projections of the image. A more accurate system model incorporates the detector response, which integrates over the area of a detector element. When the detector element is rectangular of size $T_u \times T_v$, the output of the integrating detector is given by the following expression $$g_I(\vec{S}, u, v) = \frac{1}{T_u T_v} \int_{u-\frac{T_u}{2}}^{u+\frac{T_u}{2}} \int_{v-\frac{T_v}{2}}^{v+\frac{T_v}{2}} g(\vec{S}, u, v) du\, dv \quad (3)$$

When there are gaps between the detector elements so that the detector element dimensions $T_u' \times T_v'$ are smaller than the distances $T_u \times T_v$ between the detector centers, the limits of integration in (3) are modified accordingly. The image itself is represented in discrete form using a basis function $\beta(\vec{x})$, $$f(\vec{x}) = \sum_{m,n,p} f[m, n, p]\beta(x-m, y-n, z-p) \quad (4)$$

Figure 2:
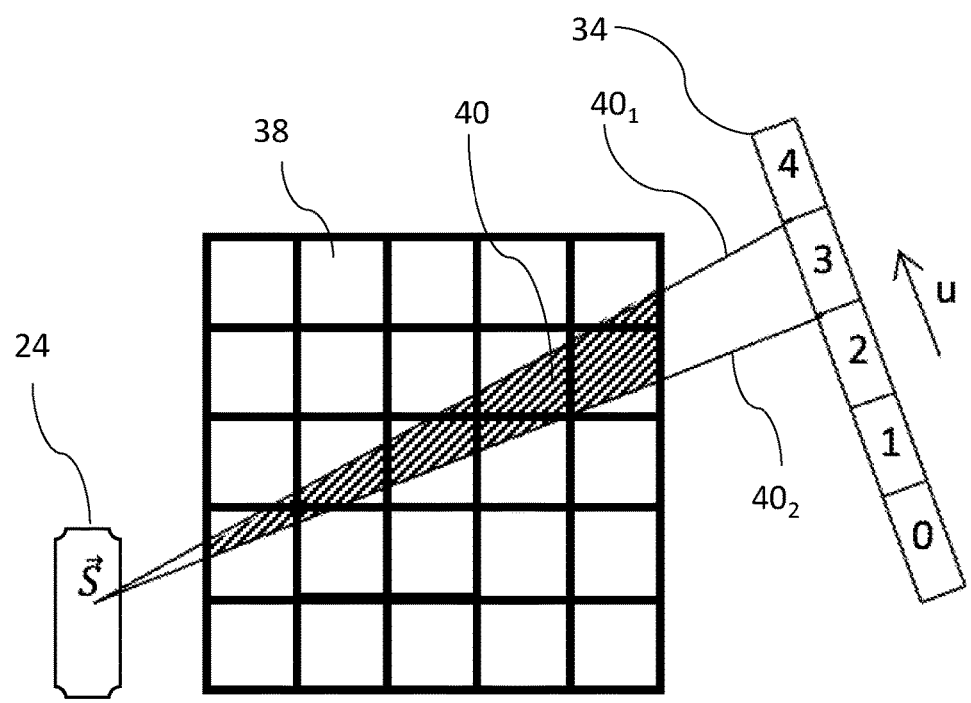
FIG. 2 illustrates an example of an image illuminated by a ray-wedge incident upon a detector element (bin)

With reference to FIG. 2, methods of the invention calculate the contributions of pixels or voxels in the image (represented by the small squares in FIG. 2) to a given detector element 343 of the detector array 34 by determining the area or volume of overlap of the pixel or voxel with a 'ray-wedge' 40, defined as the region illuminated by all rays emitted by the source that fall on a particular detector element. FIG. 2 illustrates the contribution of pixels for a ray-wedge 40 (shaded region) in the 2D case.

Denote the set of image points in a ray-wedge defined by source position $\vec{S}$ and detector element coordinates u,v, as $\chi(\vec{S},u,v)$. Combining equations (1), (3), and (4), and making a change of variables to integrate over the image domain $\vec{x}$, the forward projection equations become $$g_I(\vec{S}, u, v) = \qquad (5)$$
$$\sum_{m,n,p} f[m, n, p] \int_{\chi(\vec{S},u,v)} W(\vec{S}, u, v, \vec{x})\beta(x-m, y-n, z-p)d\vec{x}$$

The function W is a weighting function that is preferably a function of the distance $\|\vec{S}-\vec{x}\|$. It can also include a model for nonuniform detector response. In accordance with a preferred embodiment, the weighting function is approximated as constant over the support of the basis element $\beta(\vec{x})$, and uses a constant value of W evaluated at a representative point $\vec{x}_c[\vec{S},m,n,p]$.

$$g_I(\vec{S}, u, v) \approx \sum_{m,n,p} f[m, n, p] \qquad (6)$$
$$W(\vec{S}, u, v, \vec{x}_c[\vec{S}, m, n, p]) \int_{\chi(\vec{S},u,v)} \beta(x-m, y-n, z-p)d\vec{x}$$

The integral in (6) reduces to an overlap calculation of the voxel basis with the ray-wedge. In one preferred embodiment, the method specializes (6) by considering square/cubic voxels (splines of zeroth order). In this case, the integral in (6) is simply an area/volume overlap calculation, and can be calculated efficiently via the following manipulations. Other embodiments are enabled by this transformation for which the area/volume overlap calculation can be performed efficiently, for example higher order splines.

Description for a 2D Geometry

In 2D, the projection data is indexed by the detector position u. The specialization of (6) for the 2D case is $$g_I(\vec{S}, u_i) \approx \sum_{m,n} f[m,n] W(\vec{S}, u, \vec{x}_c[\vec{S}, m, n]) \int_{\chi(\vec{S},u)} \beta(x-m, y-n) d\vec{x} \quad (7)$$

Define the vector perpendicular to the source-to-voxel vector $\vec{l}(\vec{S},u)$ as $$l^\perp(\vec{S},u) = [-l_y(\vec{S},u), l_x(\vec{S},u)] \quad (8)$$

With reference to FIG. 2, the 2D ray-wedge 40 is defined as the set of points lying between the rays $40_1$ and $40_2$ connecting the source $\vec{S}$ to the boundaries of the detector element u (element $34_3$ in the example of FIG. 2). These rays $40_1$ and $40_2$ are referred to as 'wedge edges', or 'edge rays'. It follows that $$\chi(\vec{S}, u) = \left\{ \begin{array}{c} [x, y]: \text{sgn}(\langle [x, y] - \vec{S}, l^\perp(\vec{S}, u - \frac{T_u}{2})\rangle) \neq \\ \text{sgn}(\langle [x, y] - \vec{S}, l^\perp(\vec{S}, u + \frac{T_u}{2})\rangle) \end{array} \right\} \quad (9)$$

where $\langle \vec{a}, \vec{b} \rangle$ denotes the inner product between vectors $\vec{a}$ and $\vec{b}$ and $\text{sgn}(x)$ denotes the sign of x. The area integral in (7) can be expressed in terms of a function $$R(\vec{S}, m, n, u) = \int_{\chi(\vec{S},u)} \beta(x-m, y-n) d\vec{x} \quad (10)$$

representing the area of overlap between the ray-wedge 40 and the pixel basis element as a function of source position $\vec{S}$, image pixel coordinates m, n, and detector element position u, so that (7) can be rewritten as follows $$g_I(\vec{S}, u_i) \approx \sum_{m,n} f[m,n] W(\vec{S}, u, \vec{x}_c[\vec{S}, m, n]) R(\vec{S}, m, n, u) \quad (11)$$

Figure 3:
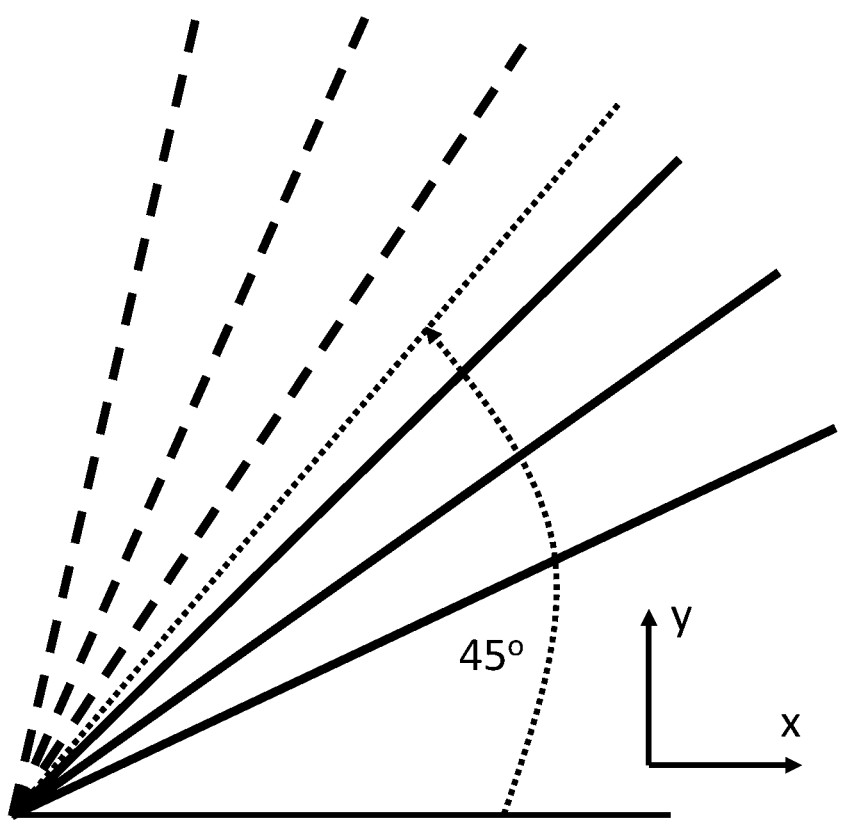
FIG. 3 illustrates an example detector edge ray classification (Solid=Mostly Horizontal, Dashed=Mostly Vertical, Dotted=Virtual 45 degree ray) process of preferred methods and systems of the invention.
Figure 4:
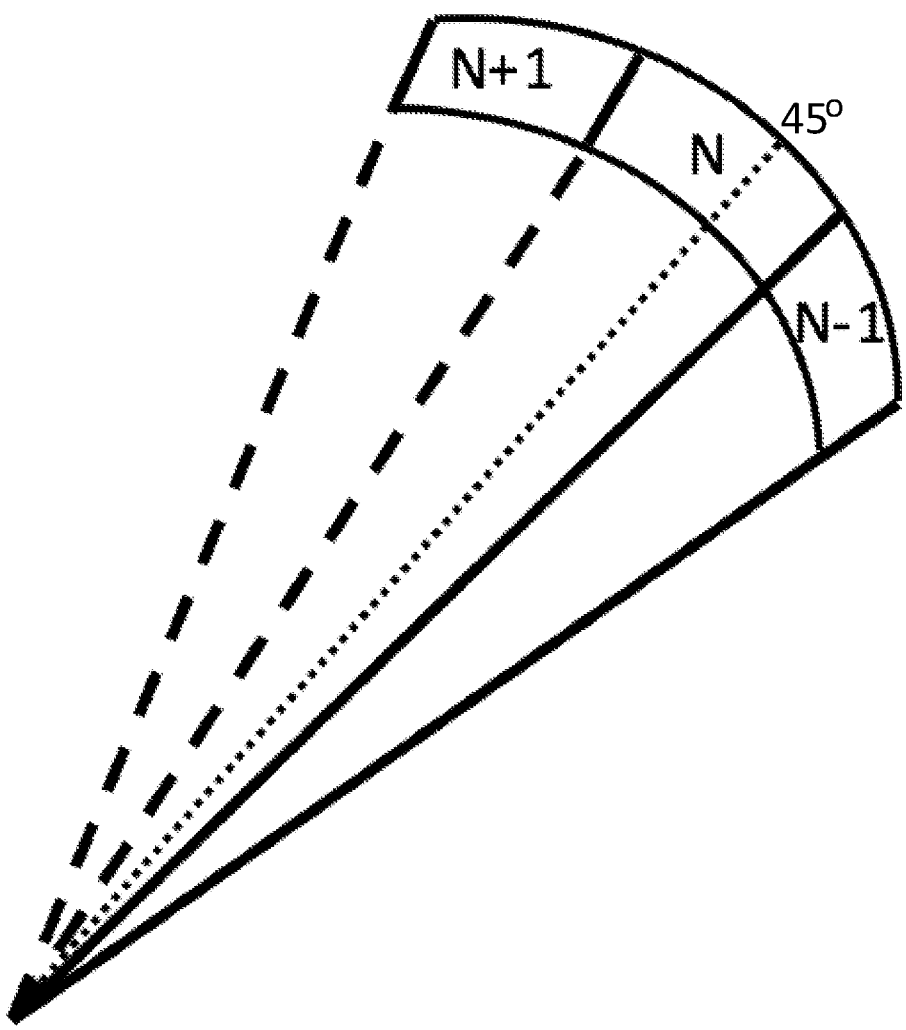
FIG. 4 illustrates an example split detector element (detector element N) due to virtual 45 degree ray of preferred methods and systems of the invention.

A 2D image is processed in image strips, either in rows or columns. In preferred embodiments, the edge rays $40_1$ and $40_2$ are divided into two groups: rays that are inclined at an angle less than 45 degrees from the x axis, called mostly horizontal rays, or horizontal rays. Rays that are inclined at an angle of more than 45 degrees are called mostly vertical rays, or vertical ray, in short. This is shown in FIG. 3, which shows three mostly horizontal (solid rays) and three mostly vertical (dashed rays). A preferred method processes the image in column strips for edge rays that are mostly horizontal, and processes the image in row strips for edge rays that are mostly vertical. The requirement is that the edge ray makes no more than a 45 degree angle with the strips that are processed for it. The key benefit of this requirement is that in a given image strip, the edge ray cannot pass through more than 2 pixels. In the special case shown in FIG. 4 of a detector element that has one wedge edge that is mostly horizontal, and another that is mostly vertical, the detector element is split into two sub-detector elements by introducing a virtual wedge edge at exactly a 45 degree angle to the image strip, indicated by the dashed line in FIG. 4. After performing the reprojection processes the contributions of the two sub-detector elements are added together. If there is an edge ray that is exactly at 45 degree angle, then no such detector splitting is required, and the 45 degree edge will be processed with both groups of mostly horizontal and mostly vertical edges.

Figure 5:
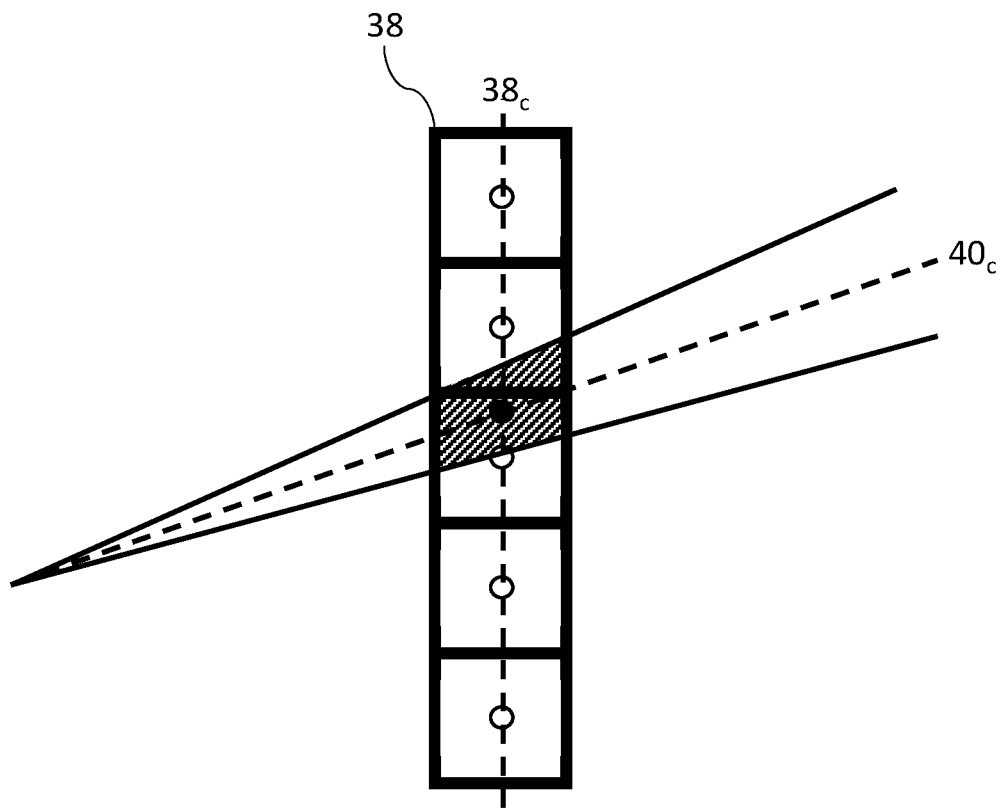
FIG. 5 illustrates a preferred reference weighting point $\vec{x}_c$ selection procedure in a column strip of preferred methods and systems of the invention; Voxel centers (open circles) vs. the selected reference point $\vec{x}_c$, on the ray-wedge central ray (filled circle); Wedge edges in solid lines, central ray in broken line.

For the following, the equations are written in terms of column strips, but are readily modified to the row strip case by swapping x for y and m for n. A column strip 38 is illustrated in FIG. 2. The reference point $\vec{x}_c$ for the weighting function must now be chosen. A natural choice would be the voxel's center—however, this point may not actually even be in the overlapped region. A better choice would be the centroid of the region of overlap between the ray-wedge and image strip, but this location is costly to calculate on the fly. A compromise location is to select the intersection of the ray-wedge's central ray $40_c$ (defined as the source to detector ray that hits the middle of the detector element) with a center line 38, of the image strip 38, as illustrated in FIG. 5. This intersection point denoted by the solid dot is the preferred reference point $\vec{x}_c$.

As a result of this reference point selection, $\vec{x}_c$, is fully determined by the triplet $(\vec{S},u,m)$. In turn, the weight function, which only depends on m and n through $\vec{x}_c$, becomes independent of the row index n, allowing for the further simplification $W(\vec{S},u,\vec{x}_c[\vec{S},m,n]) = W(\vec{S},u,m,n) = \hat{W}(\vec{S},u,m)$. One such choice for $\hat{W}(\vec{S},u,m)$ is a function of the distance between $\vec{S}$ and the image column m. It follows that $$g_I(\vec{S}, u_i) \approx \sum_{m,n} \hat{W}(\vec{S}, u, m) \sum_n f[m,n] R(\vec{S}, m, n, u) \quad (12)$$

From the definition of the projection rays in (1), the intersection of projection ray u and a vertical line m is $$\tilde{n}(\vec{S}, u, m) = \frac{(m - S_x)l_y(\vec{S}, u)}{l_x(\vec{S}, u)} + S_y \quad (13)$$

The subscripts x and y denote the x and y components of the vectors. The notation ñ is used to denote that the output of the function in (13) can be a non-integer location, as opposed to the discrete image f[m, n] which only accepts integer values of n.

Figure 6A:
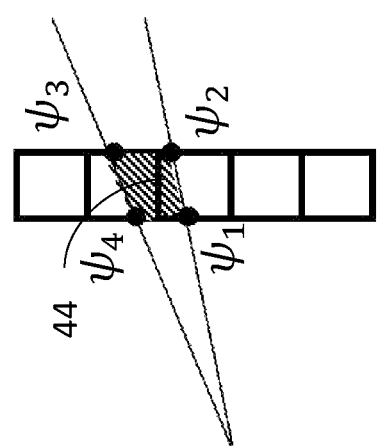
FIGS. 6A-6C illustrate an example cumulative integral subtraction technique of preferred methods and systems of the invention.

FIG. 6A shows that an overlap region 44 for a given image strip is defined by a trapezoidal region. Its four corners are defined, in units of voxel size, as the set $$\left\{ \left[m - \frac{1}{2}, \tilde{n}\left(\vec{S}, u - \frac{T_u}{2}, m - \frac{1}{2}\right)\right], \left[m + \frac{1}{2}, \tilde{n}\left(\vec{S}, u - \frac{T_u}{2}, m + \frac{1}{2}\right)\right], \right. \quad (14)$$
$$\left. \left[m - \frac{1}{2}, \tilde{n}\left(\vec{S}, u + \frac{T_u}{2}, m - \frac{1}{2}\right)\right], \left[m + \frac{1}{2}, \tilde{n}\left(\vec{S}, u + \frac{T_u}{2}, m + \frac{1}{2}\right)\right] \right\}$$

Let the points $\{\psi_1, \psi_2, \psi_3, \psi_4\}$ correspond to the n coordinate of each point in (14), sorted such that $\psi_1 < \psi_3$ and $\psi_2 < \psi_4$, i.e.

$$\psi_1 = \min\left(\tilde{n}\left(\vec{S}, u - \frac{T_u}{2}, m - \frac{1}{2}\right), \tilde{n}\left(\vec{S}, u + \frac{T_u}{2}, m - \frac{1}{2}\right)\right) \quad (15)$$

-continued $$\psi_2 = \min\left(\tilde{n}\left(\vec{S}, u - \frac{T_u}{2}, m + \frac{1}{2}\right), \tilde{n}\left(\vec{S}, u + \frac{T_u}{2}, m + \frac{1}{2}\right)\right)$$

$$\psi_3 = \max\left(\tilde{n}\left(\vec{S}, u - \frac{T_u}{2}, m - \frac{1}{2}\right), \tilde{n}\left(\vec{S}, u + \frac{T_u}{2}, m - \frac{1}{2}\right)\right)$$

$$\psi_4 = \max\left(\tilde{n}\left(\vec{S}, u - \frac{T_u}{2}, m + \frac{1}{2}\right), \tilde{n}\left(\vec{S}, u + \frac{T_u}{2}, m + \frac{1}{2}\right)\right)$$

Figure 6B:
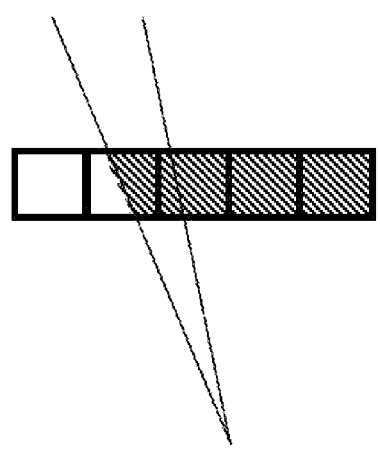
Figure 6C:
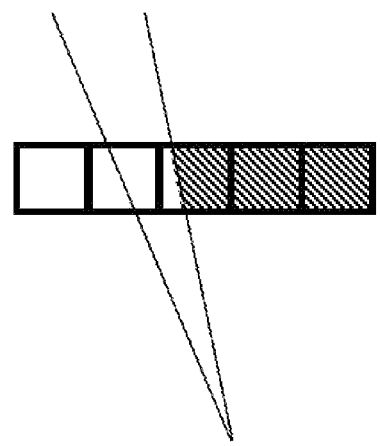

These points are indicted in FIG. 6A. The contribution of this trapezoid's overlap with the image (equivalent to the summand in the inner sum of (12)) is calculated efficiently by the difference of two cumulative strip integrals, illustrated by the shaded areas in FIGS. 6B and 6C, respectively. Each cumulative strip integral accumulates from the bottom of the image strip up to the respective edge of the detector ray-wedge, weighted by the voxel values in the image strip. The total contribution, shown shaded in FIG. 6A, is the difference between these two cumulative integrals.

A cumulative strip integral can be expressed as a function $C(s,\delta_1,\delta_2)$, where s is a 1D discrete signal (with elements s[n] corresponding to an image strip) and $\delta_1,\delta_2$ are the (possibly fractional) indices denoting the end points of the cumulative strip integration. The $\delta_1,\delta_2$ points correspond to the intersection points with the two sides of the strip (e.g. $\psi_1, \psi_2$). This allows for (12) to be written as $$g_I(\vec{S}, u) = \sum_m \hat{W}(\vec{S}, u, m)[C(f[m, :], \psi_3(\vec{S}, u, m), \psi_4(\vec{S}, u, m)) - \quad (16)$$

$$C(f[m, :], \psi_1(\vec{S}, u, m), \psi_2(\vec{S}, u, m))]$$

The convention f[m,:] denotes the mth column of the image. The benefit of this transformation is that the inner summation loop of (12) is replaced by the two function evaluations of the function C, which reduces the amount of branching in the computer implementation of the method.

The function $C(s,\delta_1,\delta_2)$ can be evaluated efficiently as well. Let L and H denote the lower and higher of the $\delta_1,\delta_2$ coordinate points, respectively, i.e. $L=\min(\delta_1,\delta_2),H=\max(\delta_1,\delta_2)$. Split the point's coordinate into its respective integer and fractional components, denoted by subscripts $\Delta$ and $\tau$, $$L = L_\Delta + L_\tau \quad (17)$$

$$L_\tau \in [0, 1)$$

Figure 7A:
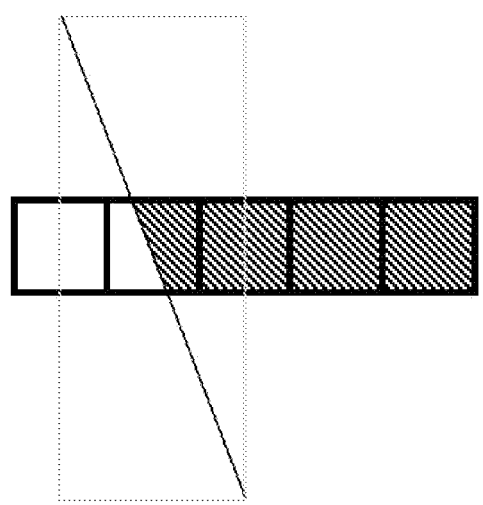
FIGS. 7A-7B illustrate wedge edge intersection case procedures of preferred methods and systems of the invention.
Figure 7B:
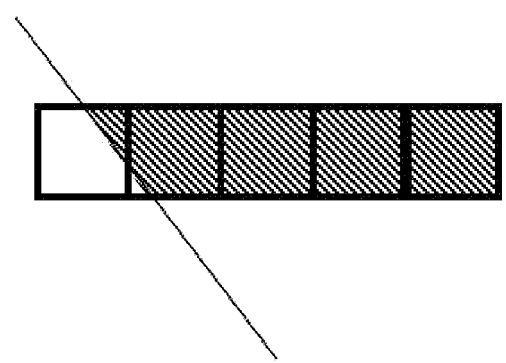

The values $H_\Delta, H_\tau$ are similarly defined. By construction, the wedge edges intersect at most two voxels in a given image strip, as illustrated in FIGS. 7A and 7B. Define the accumulation function A as $$A(s, n) = \sum_{\ell=0}^{n} s[\ell] \quad (18)$$

The slope of the ray is defined as $\sigma = H - L$, which is invariant with the strip location m. For the single voxel intersection case, the C function evaluation (redefined in terms of the points L and H) is $$C(s, L, H) = A(s, L_\Delta - 1) + \left(\frac{1}{2}\sigma + L_\tau\right) s[L_\Delta] \quad (19)$$

The two voxel intersection case involves more complex terms $$C(s, L, H) = \quad (20)$$

$$A(s, L_\Delta - 1) + \frac{1}{2}\sigma\left(\frac{H_\tau}{\sigma}\right)^2 s[H_\Delta] + \left(L_\tau + \frac{1}{2}\sigma - \frac{1}{2}\sigma\left(\frac{H_\tau}{\sigma}\right)^2\right)s[L_\Delta]$$

Making the substitution $$s[n] = A(s, n) - A(s, n-1) \quad (21)$$

and using the definition of a linear interpolation operation for a vector h and scalar $\in$ that is split into its integer and fractional parts similarly to (16)

$$LI(h, \in) = h[\in_\Delta](1 - \in_\tau) + h[\in_\Delta + 1]\in_\tau \quad (22)$$

the complex form of (20) can be expressed concisely as $$C(s, L, H) = LI(A(s), L - 1) + \frac{1}{2}\sigma LI\left(s, L_\Delta + \left(\frac{H_\tau}{\sigma}\right)^2\right) \quad (23)$$

Additionally, using the calculation $$\tilde{H}_\tau = \max(0, H(L_\Delta + 1)) \quad (24)$$

and replacing $H_\tau$ in (23) by $\tilde{H}_\tau$ allows for the two intersection cases to be unified.

$$C(s, L, H) = LI(A(s), L - 1) + \frac{1}{2}\sigma LI\left(s, L_\Delta + \left(\frac{\tilde{H}_\tau}{\sigma}\right)^2\right) \quad (25)$$

Note that the evaluation effectively reverts to (19) when only a single voxel is intersected. The reciprocal of $\sigma$ can be precalculated. To avoid numerical instability, when the slope is very small, e.g. $\sigma < \sigma_{min}$ then $1/\sigma$ is set to 0. This clamping of the reciprocal has minimal effect on the numerical evaluation of (25), as the entire second term vanishes as $\sigma \to 0$. With this unified representation, the cumulative strip integral C can be calculated efficiently, with no branching in the inner loop, assuming the max operation is available as an instruction in the architecture. Further, it is well suited to architectures that provide linear interpolation functionality in hardware, such as GPUs.

Note that the function A(s) will be used for multiple different source locations $\vec{S}$ (projections) and therefore the cost of forming A (s) is quickly amortized. The preaccumulatation of the image along rows/columns is denoted by $$A_C[m, n] = \sum_{\ell=0}^{n} f[m, \ell] + A_C[m, \ell - 1] \quad (26)$$

$$A_R[m, n] = \sum_{\ell=0}^{m} f[\ell, n] + A_R[\ell - 1, n]$$

We denote the use of the pre-accumulated image strip explicitly as $C(s,A,\delta_1,\delta_2)$. Additionally, the detector bins share edges, allowing terms in the computation of (16) to be reused since $\psi_3(\vec{S},u,m) = \psi_1(\vec{S},u+1,m)$ and $\psi_4(\vec{S},u,m) = \psi_2(\vec{S},u+1,m)$. Define the 'edge' calculation $E[\vec{S},f,A,u,m]$ as $$E[\vec{S},f,A,u,m] = C(f[m,:],A[m,:],\psi_1(\vec{S},u,m),\psi_2(\vec{S},u,m)) \quad (27)$$

The difference of these edge calculations can be expressed as $$D[\vec{S},f,A,u,m] = E[\vec{S},f,A,u+1,m] - E[\vec{S},f,A,u,m] \quad (28)$$

Then (16) can be rewritten as $$g_I(\vec{S}, u) = \sum_m \hat{W}(\vec{S}, u, m) D[\vec{S}, f, A, u, m] \qquad (29)$$

FIG. 8 provides pseudocode for implementing the method. This 2D approach is also applicable for a 2.5D scenario involving a 2D detector panel arrangement where the detector panel may be curved, and where the rays are all assumed to be approximately parallel to the x/y planar slices (so-called axial, trans-axial or transverse slices) of the image volume. In this 2.5D scenario, the data is processed separately for each axial slice of the imaged volume and each corresponding set of elements of the 2D detector array that is intersected by the rays passing through the axial slice. The description that follows is for the processing of a single such 2D slice and the corresponding single such detector row. First, the image is pre-accumulated along the x and y directions (800). For each source position (also known as 'view'), the wedge edges (edge rays) for the detector bins are classified into horizontal and vertical directions (810). For the horizontal wedge edge set, the cumulative area is calculated for each detector wedge edge (820). For each detector with horizontal wedge edges, the cumulative areas are differenced, weighted, and accumulated (830). This is repeated for each image column. For the vertical wedge edge set, the cumulative area is calculated for each detector wedge edge (840). For each detector with vertical edges, the cumulative areas are differenced, weighted, and accumulated (850). This is repeated for each image row. After all detectors have been processed for a given view, the procedure is repeated for the remaining views.

Preferred Method for a 3D Geometry

The 3D realization of the method extends the 2D method by processing the image volume in 'column slabs' f[m,:,:] or 'row-slabs' f[:,n,:]. We refer to the set of detector elements g[u,:] as the detector column u, and to the set of detector elements g[:,v] as the detector row v. The decision to select 'column-slabs' or 'row-slabs' is based on the same mostly horizontal or mostly vertical determination of the edge ray direction, this time applied to the in-plane component $[1_x(\vec{S}, u-T_u/2)\; 1_y(\vec{S}, u-T_u/2)]$ of a ray from the source to the edge of the detector column. All elements in the detector column u are assigned the same horizontal/vertical selection, regardless of the detector coordinate v. The only requirement is that the (axial) half-cone angle, defined as the angle the ray makes with the x-y plane, be less than 35.3 degrees, because a larger cone angle would violate the two-voxel intersection case. However, this requirement is satisfied by most CT imaging systems in place today. For the following, the equations are written in terms of column slabs f[m,:,:], but are readily modified to the row slab case by swapping x for y and m for n.

The generalization of (12) for 3D is $$g_I(\vec{S}, u, v) \approx \sum_m \hat{W}(\vec{S}, u, v, m) \sum_{n,p} f[m, n, p] R_3(\vec{S}, m, n, p, u, v) \qquad (30)$$

where function $$R_3(\vec{S}, m, n, p, u, v) = \int_{\chi(\vec{S},u,v)} \beta(x-m, y-n, z-p) d\vec{x} \qquad (31)$$

represents the volume of overlap between the ray-wedge formed by the rays from the source $\vec{S}$ to the edges of the detector element at position u,v on the detector panel and the voxel basis element centered at image coordinates m,n,p. The intersection cases for determining $R_3$ in the 3D case become numerous and complex. To avoid this complexity, in a preferred embodiment the 3D volume overlap function is approximated as a product $$R_3(\vec{S},m,n,p,u,v) \approx R_z(\vec{S},m,p,u,v) R_2(\vec{S},m,n,u) \qquad (32)$$

of two functions: (i) the 2D overlap function $R_2(\vec{S},m,n,u)$, called in this case the transaxial overlap area function is defined as $$R_2(\vec{S}, m, n, u) = \int_{\chi_{2D}(\vec{S},u)} \beta(x-m, y-n, 0) d\vec{x} \qquad (33)$$

where $\chi_{2D}(\vec{S},U)$ is the 2D transaxial analogue of $\chi(\vec{S},u,v)$, i.e., it is the set of image points in the transverse plane containing the source in a ray-wedge defined by source position $\vec{S}$ and detector element coordinate u; and (ii) an axial area (length) function defined as $$R_z(\vec{S}, m, p, u, v) = \int_{\chi_z(\vec{S},u,v)} \beta(0, 0, z-p) dz \qquad (34)$$

where $\chi_z(\vec{S},u,v)$ is the 1D axial analogue of $\chi(\vec{S},u,v)$, i.e., $\chi_z(\vec{S},u,v)$ is the set of z coordinate values of image points in the intersection of the following: (a) the ray-wedge defined by source position $\vec{S}$ and detector element coordinates u,v; with (b) a line parallel to the z axis that intersects the center line of the ray wedge and lies in the center plane of the column slab indexed by m.

With the approximation in (32), the 2D overlap calculation (the summation over n,p in (30)) is approximated by a sequence of 1D overlap calculations.

$$g_I(\vec{S}, u, v) \approx \sum_m \hat{W}(\vec{S}, u, v, m) \qquad (35)$$

$$\sum_p R_z(\vec{S}, m, p, u, v) \sum_n f[m, n, p] R_2(\vec{S}, m, n, u)$$

The inner sum in (35) is the 1D overlap calculation (inner summation in (12)) applied slice-by-slice (with slice index p) to the image volume, using the transaxial area function $R_2$ defined in (33). Following manipulations analogous to those used to express (12) in the form of (29) results in a slice-by-slice application of each term, as shown in (36)-(39) with the contribution of all slices aggregated in (40):

$$A_C[m, n, p] = \sum_{\ell=0}^{n} f[m, \ell, p] + A_C[m, \ell-1, p] \qquad (36)$$

$$A_R[m, n, p] = \sum_{\ell=0}^{m} f[\ell, n, p] + A_R[\ell-1, n, p] \qquad (37)$$

$$E[\vec{S}, f, A, u, m, p] = \qquad (38)$$
$$C(f[m, :, p], A[m, :, p], \psi_1(\vec{S}, u, m), \psi_2(\vec{S}, u, m))$$

-continued $$D[\vec{S}, f, A, u, m, p] = E[\vec{S}, f, A, u+1, m, p] - E[\vec{S}, f, A, u, m, p] \quad (39)$$

$$g_I(\vec{S}, u, v) = \sum_m \hat{W}(\vec{S}, u, v, m) \sum_p D[\vec{S}, f, A, u, m, p] R_z(\vec{S}, m, p, u, v) \quad (40)$$

Denote the result of the innermost sum of (40) as $h[\vec{S},D,u,v,m]$.

$$h[\vec{S}, D, u, v, m] = \sum_p D[\vec{S}, f, A, u, m, p] R_z(\vec{S}, m, p, u, v) \quad (41)$$

Figure 9:
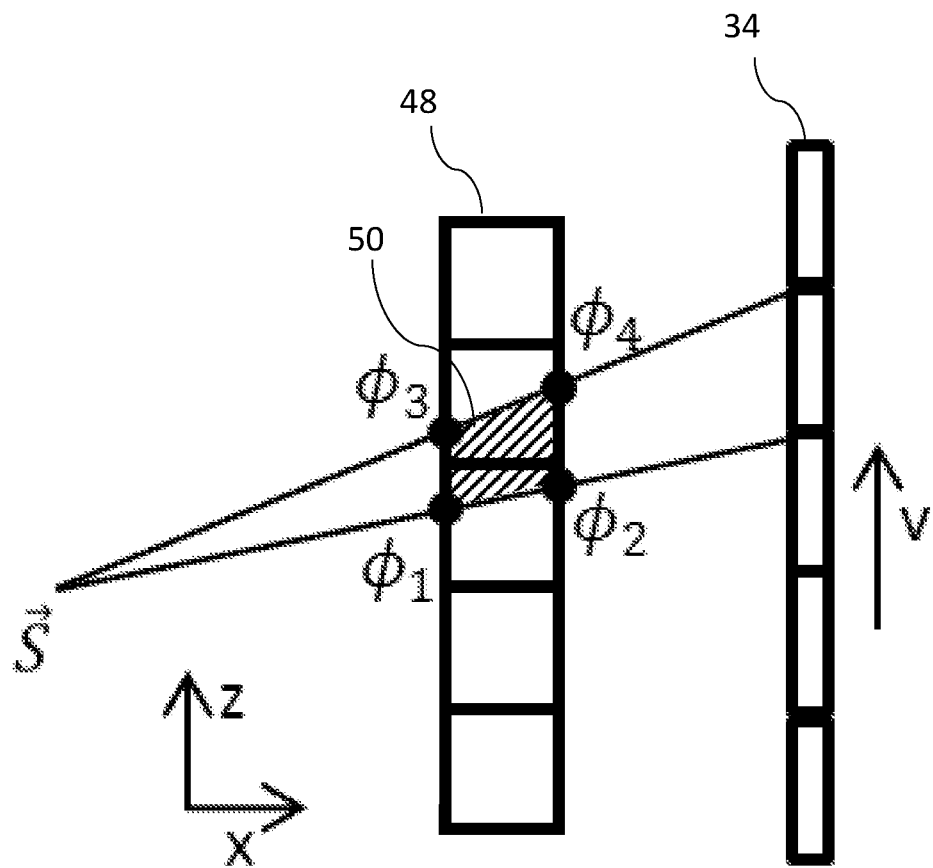
FIG. 9 illustrates a Z overlap process with an image slab of preferred methods and systems of the invention.

The axial overlap $R_z$ is determined by tracing the center line of the detector bin parallel to the v detector coordinate, that is the segment $(u, v \pm T_v/2)$ on the detector panel, back to the edges of the image slab 48, which yields a trapezoidal region 50 in FIG. 9 (shaded region). This region 50 will be used to calculate the overlap contributions to that specific (u,v) detector. Using the intersection calculation $$\tilde{p}(\vec{S}, u, v, m) = \frac{(m - S_x)\ell_z(\vec{S}, v)}{\ell_x(\vec{S}, u)} + S_z \quad (42)$$

the coordinates of the corners of this trapezoid are given by $$\left\{ \left[m - \frac{1}{2}, \tilde{p}\left(\vec{S}, u, v - \frac{T_v}{2}, m - \frac{1}{2}\right)\right], \right. \quad (43)$$
$$\left[m + \frac{1}{2}, \tilde{p}\left(\vec{S}, u, v - \frac{T_v}{2}, m + \frac{1}{2}\right)\right], \left[m - \frac{1}{2}, \right.$$
$$\left. \tilde{p}\left(\vec{S}, u, v + \frac{T_v}{2}, m - \frac{1}{2}\right)\right], \left[m + \frac{1}{2}, \tilde{p}\left(\vec{S}, u, v + \frac{T_v}{2}, m + \frac{1}{2}\right)\right] \right\}$$

Let the points $\{\phi_1, \phi_2, \phi_3, \phi_4\}$ in FIG. 9 correspond to the $\tilde{p}$ coordinate of each point in (43), sorted in an analogous manner to (15). The overlap calculation strategy of (16) is applied to D instead of to f in (16), using the following expression.

$$h[\vec{S},D,u,v,m]=\gamma(\vec{S},u)[C(D[\vec{S},f,A,u,m,:],$$
$$\phi_3(\vec{S},u,v,m),\phi_4(\vec{S},u,v,m))-C(D[\vec{S},f,A,u,m,:],$$
$$\phi_1(\vec{S},u,v,m),\phi_2(\vec{S},u,v,m))] \quad (44)$$

The scaling factor $\gamma(\vec{S},u)$ adjusts for the fact that this intersection region 50 is not strictly parallel to the x or y axis, but is rotated with respect to the x-y coordinate system. The length of this intersection region when projected to the x-y plane is $\gamma(\vec{S},u)$, defined as $$\gamma(\vec{S}, u) = \frac{\sqrt{\ell_x(\vec{S}, u) + \ell_y(\vec{S}, u)}}{|\ell_x(\vec{S}, u)|} \quad (45)$$

As this constant is independent of the image, it can be factored out of the inner computational loops and combined with W instead:

$$\tilde{W}(\vec{S},u,v,m)=\hat{W}(\vec{S},u,v,m)\gamma(\vec{S},u) \quad (46)$$

$$\tilde{h}[\vec{S},D,u,v,m]=C(D[\vec{S},f,A,u,m,:],\phi_3(\vec{S},u,v,m), \quad (47)$$
$$\phi_4(\vec{S},u,v,m))-C(D[\vec{S},f,A,u,m,:],\phi_1(\vec{S},u,v,m),$$
$$\phi_2(\vec{S},u,v,m))$$

Finally, the contributions from all image slabs are weighted and accumulated.

$$g_I(\vec{S}, u, v) \approx \sum_m \tilde{W}(\vec{S}, u, v, m)\tilde{h}[\vec{S}, D, u, v, m] \quad (48)$$

Figure 10:
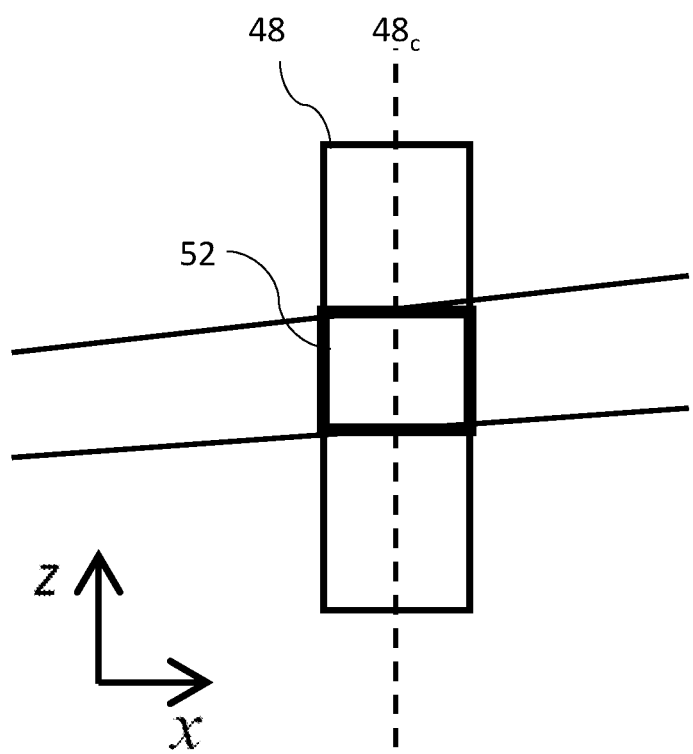
FIG. 10 illustrates a rectangular approximation of a Z intersection in accordance with preferred methods and systems of the invention.

For imaging geometries where the cone angle is small, the top and bottom of the trapezoidal intersection region can be considered almost parallel to the x-y plane and can be approximated as a rectangle 52 as shown in FIG. 10. Under this approximation, $\phi_1=\phi_2$ and $\phi_3=\phi_4$. This makes the corresponding slope $\sigma=0$ for these rays, and simplifies the calculation of C by eliminating the second term in (25).

$$\tilde{h}[\vec{S},D,u,v,m] \approx \tilde{C}(D[\vec{S},f,A,u,m,:],\phi_3(\vec{S},u,v,m))-$$
$$\tilde{C}(D[\vec{S},f,A,u,m,:],\phi_1(\vec{S},u,v,m)) \quad (49)$$

with simplified overlap calculation $$\tilde{C}(s,L)=LI(A(s),L-1) \quad (50)$$

FIG. 11 provides pseudo code to implement the reprojection method in 3D. First, the image is pre-accumulated along the x/z and y/z directions (1100). For each source position (view), the detector edges are classified into horizontal and vertical directions (1110). For the horizontal edge set, the cumulative area is calculated for each detector edge in a slice-by-slice manner (1120). For each detector element with horizontal edges, the cumulative areas are differenced (1130). For each detector element in the detector column slab, an axial overlap calculation is performed (1140) and then this value is weighted and accumulated to each detector element (1150). This is repeated for each image column slab. An analogous procedure is performed for the vertical edge set (1160, 1170, 1180, 1190). After all detectors have been processed for a given source position (view), the procedure is repeated for the remaining views.

Backprojection

Backprojection, the adjoint operation of reprojection, can also be calculated using the above method. The most general form of reprojection from (30) is transformed to a backprojection operation as $$f[m, n, p] = \sum_{\vec{S},u,v} g_I(\vec{S}, u, v)\tilde{W}(\vec{S}, u, v, m)R(\vec{S}, m, n, p, u, v) \quad (51)$$

For the more sophisticated forms of the method using (27)-(29) or (36)-(40), the same flow reversal can be performed to yield the backprojection operation, The linear anterpolation operation (adjoint to linear interpolation) accepts a scalar value $\beta$ and location t with integer and fractional parts $t_z$ and $t_\tau$, respectively, and produces the output sequence $LA(\beta,t)$ with elements $$LA(\beta, t)[n] = \begin{cases} \beta(1 - t_\tau) & n = t_z \\ \beta t_\tau & n = t_z + 1 \\ 0 & \text{else} \end{cases} \quad (52)$$

Define $\Omega$ as a "reverse accumulation" operator (i.e. accumulate starting at the far end instead of the near end of the signal), $$\Omega x[n] = \sum_{k=n}^{N} x[k] \quad (53)$$

The adjoint of the function $C(f,A,\delta_1,\delta_2)$ must be split into two parts, as it updates both f and A differently $$C_A^*(\beta, \delta_1, \delta_2) = LA(\beta, L-1) \tag{54}$$

$$C_f^*(\beta, \delta_1, \delta_2) = \frac{1}{2}\sigma LA\left(\beta, L_\Delta + \left(\frac{H_\tau}{\sigma}\right)^2\right) \tag{55}$$

where $L, L_\Delta, H$ and $H_\tau$ are defined as before. The adjoint of the function $C(f,\delta_1,\delta_2)$ can be expressed in a single equation $$C^*(\beta,\delta_1,\delta_2) = C_f^*(\beta,\delta_1,\delta_2) + \Omega C_A^*(\beta,\delta_1,\delta_2) \tag{56}$$

Similarly, the adjoint of the function $\tilde{C}(f,\delta)$ is $$\tilde{C}^*(\beta,\delta) = \Omega LA(\beta,\delta-1) \tag{57}$$

These functions are used to define the backprojection operation. For 2D backprojection, this is the adjoint of the sequence of equations (26)-(29). The intermediate terms when used in the backprojection context are denoted with a * symbol.

$$D^*[\vec{S}, g, u, m] = \hat{W}(\vec{S}, u, m)g_I(\vec{S}, u) \tag{58}$$

$$E^*[\vec{S}, g, u, m] = D^*[\vec{S}, g, u-1, m] - D^*[\vec{S}, g, u, m] \tag{59}$$

$$f^*[m, :] = \sum_{\vec{S},u} C_f^*(E^*[\vec{S}, g, u, m], \psi_1(\vec{S}, u, m), \psi_2(\vec{S}, u, m)) \tag{60}$$

$$A^*[m, :] = \sum_{\vec{S},u} C_A^*(E^*[\vec{S}, g, u, m], \psi_1(\vec{S}, u, m), \psi_2(\vec{S}, u, m)) \tag{61}$$

$$\hat{A}_C^*[m, n] = \Omega A_C^*[m, :] \tag{62}$$

$$\hat{A}_R^*[m, n] = \Omega A_R^*[:, n] \tag{63}$$

$$f[m, n] = f^*[m, n] + \hat{A}_C^*[m, n] + \hat{A}_R^*[m, n] \tag{64}$$

FIG. 12 provides pseudo code for performing the 2D backprojection method. First, the image and pre-accumulated temporary images are initialized to zero (1200). For each source position (view), the detector edge rays are classified into horizontal and vertical directions (1210). For each detector element with a horizontal edge ray, a weighting is applied to the value of the projection for this detector element (1220). For each horizontal edge ray, a difference of weighted detector element values is taken (1230), after which all pixels in the current column of the image and pre-accumulated image are updated (1240). This is repeated for each image column. For each detector element with a vertical edge ray, a weighting is applied to the value of the projection for this detector element (1250). For each vertical edge ray, a difference of weighted detector values is taken (1260), after which all pixels in the current row of the image and pre-accumulated image are updated (1270). This is repeated for each image row. After all detector elements have been processed for a given source position (view), the procedure is repeated for the remaining views. Once all views have been processed, the pre-accumulated temporary images are reverse accumulated and added to the output image (1280).

3D backprojection is the adjoint of the sequence of equations for 3D reprojection given above. The first step is $$\tilde{h}^*[\vec{S},g,u,v,m] = \tilde{W}(\vec{S},u,v,m)g_I(\vec{S},u,v) \tag{65}$$

When using the trapezoid area overlap in Z, the next step is $$D^*[\vec{S}, g, u, m, p] = \tag{66}$$
$$\sum_v C^*(\tilde{h}^*[\vec{S}, g, u, v, m], \phi_3(\vec{S}, u, v, m), \phi_4(\vec{S}, u, v, m)) -$$
$$C^*(\tilde{h}^*[\vec{S}, g, u, v, m], \phi_1(\vec{S}, u, v, m), \phi_2(\vec{S}, u, v, m))$$

For the rectangular overlap approximation in Z, the adjoint operation is instead $$D^*[\vec{S}, g, u, m, p] = \sum_v \tilde{C}^*(\tilde{h}^*[\vec{S}, g, u, v, m], \phi_3(\vec{S}, u, v, m)) - \tag{67}$$
$$\tilde{C}^*(\tilde{h}^*[\vec{S}, g, u, v, m], \phi_1(\vec{S}, u, v, m))$$

For uniformity, this step is denoted as $R^*(\tilde{h}^*)$.

$$D^*[\vec{S},g,u,m,p] = R^*(\tilde{h}^*[\vec{S},g,u,v,m], \phi_1(\vec{S},u,v,m),$$
$$\phi_2(\vec{S},u,v,m), \phi_3(\vec{S},u,v,m), \phi_4(\vec{S},u,v,m)) \tag{68}$$

The remaining steps are common to both Z overlap strategies.

$$E^*[\vec{S}, g, u, m, p] = D^*[\vec{S}, g, u-1, m, p] - D^*[\vec{S}, g, u, m, p] \tag{69}$$

$$f^*[m, :, p] = \sum_{\vec{S},u} C_f^*(E^*[\vec{S}, g, u, m, p], \psi_1(\vec{S}, u, m), \psi_2(\vec{S}, u, m)) \tag{70}$$

$$A^*[m, :, p] = \sum_{\vec{S},u} C_A^*(E^*[\vec{S}, g, u, m, p], \psi_1(\vec{S}, u, m), \psi_2(\vec{S}, u, m)) \tag{71}$$

$$\hat{A}_C^*[m, n, p] = \Omega A_C^*[m, :, p] \tag{72}$$

$$\hat{A}_R^*[m, n, p] = \Omega A_R^*[:, n, p] \tag{73}$$

$$f[m, n, p] = f^*[m, n, p] + \hat{A}_C^*[m, n, p] + \hat{A}_R^*[m, n, p] \tag{74}$$

FIG. 13 provides pseudo code for the 3D backprojection method. First, the image and pre-accumulated temporary images are initialized to zero (1300). For each source position (view), the detector edge rays are classified into horizontal and vertical directions (1305). For each detector with a horizontal edge ray, the projection values for all detector elements in the corresponding column slab are weighted (1310), and the adjoint overlap function is calculated (1315). For each image slice, the difference of the adjoint overlap result is taken (1320), after which all pixels in the current column of the image and pre-accumulated image are updated (1325). This is repeated for each image column slab. An analogous procedure is applied for the vertical detector edge rays (1330, 1335, 1340, 1345). After all detector elements have been processed for a given view, the procedure is repeated for the remaining views. Once all views have been processed, the pre-accumulated temporary images are reverse accumulated and added to the output image (1350).

Computer System

Figure 14:
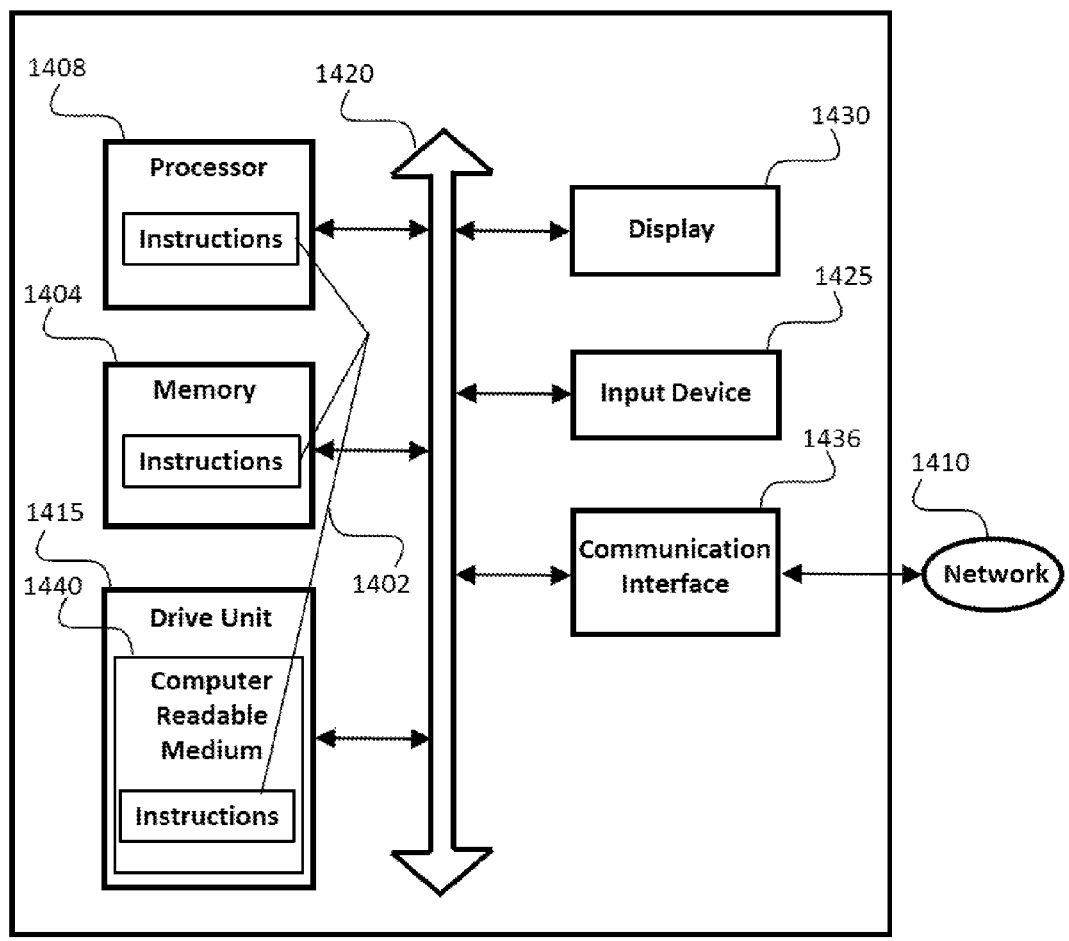
FIG. 14 illustrates a general computer system that can perform preferred methods of the invention and can serve as both the image reconstructor 10 and the computer 20 of FIG. 1.

FIG. 14 illustrates a general computer system 1400 that can perform the above methods and can serve as both the image reconstructor 10 and the computer 20 of FIG. 1. The system 1400 can represent such a computer in a computed tomography (CT) system, or other imaging system, or a processing device coupled with an imaging system for processing imaging data from an imagining system, and generating control signals such as acquisition parameter settings for an imaging system. The computer system 1400 may include an ordered listing of a set of instructions 1402 that may be executed to cause the computer system 1400 to perform any one or more of the methods or computer-based functions disclosed herein. The computer system 1400 may operate as a stand-alone device or may be connected to other computer systems or peripheral devices, e.g., by using a network 1410.

In a networked deployment, the computer system 1400 may operate in the capacity of a server or as a client-user computer in a server-client user network environment, or as a peer computer system in a peer-to-peer (or distributed) network environment. The computer system 1400 may also be implemented as or incorporated into various devices, such as a personal computer or a mobile computing device capable of executing a set of instructions 1402 that specify actions to be taken by that machine, including and not limited to, accessing the internet or web through any form of browser. Further, each of the systems described may include any collection of sub-systems that individually or jointly execute a set, or multiple sets, of instructions to perform one or more computer functions.

The computer system 1400 may include a memory 1404 on a bus 1420 for communicating information. Code operable to cause the computer system to perform any of the acts or operations described herein may be stored in the memory 1404. The memory 1404 may be a random-access memory, read-only memory, programmable memory, hard disk drive or any other type of volatile or non-volatile memory or storage device.

The computer system 1400 may include a processor 1408, such as a central processing unit (CPU) and/or a graphics processing unit (GPU). The processor 1408 may include one or more general processors, digital signal processors, application specific integrated circuits, field programmable gate arrays, digital circuits, optical circuits, analog circuits, combinations thereof, or other now known or later-developed devices for analyzing and processing data. The processor 1408 may implement the set of instructions 1402 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 1400 may also include a disk or optical drive unit 1415. The disk drive unit 1415 may include a non-transitory computer-readable medium 1440 in which one or more sets of instructions 1402, e.g., software, can be embedded. Further, the instructions 1402 may perform one or more of the operations as described herein. The instructions 1402 may reside completely, or at least partially, within the memory 1404 and/or within the processor 1408 during execution by the computer system 1400. Accordingly, the data acquired by a scanner or imaging system and/or the numerical phantom data generated as described above may be stored in the memory 1404 and/or the disk unit 1415.

The memory 1404 and the processor 1408 also may include non-transitory computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 1400 may include an input device 1425, such as a keyboard or mouse, configured for a user to interact with any of the components of system 1400. It may further include a display 1430, such as a liquid crystal display (LCD), a cathode ray tube (CRT), or any other display suitable for conveying information. The display 1430 may act as an interface for the user to see the functioning of the processor 1408, or specifically as an interface with the software stored in the memory 1404 or the drive unit 1415.

The computer system 1400 may include a communication interface 1436 that enables communications via the communications network 1410. The network 1410 may include wired networks, wireless networks, or combinations thereof. The communication interface 1436 to the network may enable communications via any number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program, which includes features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for forward or back projection in computed tomography (CT), the method comprising:
   imaging a subject with a divergent beam source to obtain an image representation of the subject including a plurality of image pixels or voxels; and
   forward projecting the image pixels or voxels onto or back projecting them from a detector array containing a plurality of bins, such that the contribution of a pixel or voxel to detector bin in the forward case or the contribution of a detector bin to a pixel or voxel in the backward case is determined by the intensity value assigned to the pixel or voxel or to the detector bin, respectively, multiplied by the product of an area or volume of overlap and an additional weighting factor, and wherein the area in 2D or volume in 3D of overlap is determined in the image pixel or voxel domain by calculation of exact or approximate overlap of the image domain pixel with the area in 2D or voxel with the volume in 3D illuminated by a ray-wedge defined by the source position and detector bin edge rays traced through the image domain.

2. A method for forward or back projection in computed tomography (CT), the method comprising:
   imaging a subject with a divergent beam source to obtain an image representation of the subject including a plurality of image pixels or voxels, and
   forward projecting the image pixels or voxels onto or back projecting them from a detector array containing a plurality of bins, such that the contribution of a pixel or voxel to detector bin in the forward case or the contribution of a detector bin to a pixel or voxel in the backward case is determined by the intensity value assigned to the pixel or voxel or to the detector bin, respectively, multiplied by the product of an area or volume of overlap and an additional weighting factor, and wherein the area or volume of overlap is determined by overlap of the pixel or voxel with the area or volume illuminated by a ray-wedge defined by the source position and detector bin edge rays, wherein detector bin edge rays are divided into groups of horizontal and vertical rays, based on whether a given ray makes a larger angle with a first coordinate axis or a second coordinate axis, and if no such ray already exists among the detector edge rays, a virtual edge ray is added which has exactly a 45 degree or −45 degree orientation with respect to the first coordinate axis and is included in both groups.

3. The method of claim 2, wherein said forward or back projecting comprises projecting or projecting onto a 3D image volume, the area of overlap comprises a volume of overlap, and the weighting factor is multiplied by a volume of overlap, and wherein the volume of overlap is approximated as a transaxial overlap area multiplied by an axial overlap length.

4. The method of claim 2, wherein the weighting factor is approximated as a function that is independent of the image column for detector bins with horizontal edge rays, or independent of the image row for detector bins with vertical edge rays.

5. The method of claim 4, wherein said forward or back projecting comprises projecting or projecting onto a 3D image volume, the area of overlap comprises a volume of overlap, and the weighting factor is multiplied by a volume of overlap, and wherein the volume of overlap is approximated as a transaxial overlap area multiplied by an axial overlap length.

6. The method of claim 4, wherein the weighting factor is a function of the distance from the source to the centerline of the image column or image row for horizontal and vertical detector bin edge rays, respectively, along the ray connecting the source to the center of the detector bin.

7. The method of claim 4, wherein the area of overlap is calculated as a difference of two cumulative area calculations, which begin at one end of the image row or column.

8. The method of claim 7, wherein the cumulative area calculation for an image strip s (either a row or column) and detector bin edge ray is determined by $$C(s, L, H) = LI(A(s), L-1) + \frac{H-L}{2} LI\left(s, \lfloor L \rfloor + \left(\frac{\tilde{H}_\tau}{H-L}\right)^2\right)$$

where $A(s)$ is a cumulative sum, L and H represent the lower and higher points of the intersection of the edge ray with the image strip edges, $LI(f,t)$ denotes linear interpolation of discrete sequence f at continuous point t, and $\tilde{H}_\tau = \max(0, H - \lfloor L \rfloor - 1)$.

9. The method of claim 7, wherein said forward or back projecting comprises projecting or projecting onto a 3D image volume, the area of overlap comprises a volume of overlap, and the weighting factor is multiplied by a volume of overlap, and wherein the volume of overlap is approximated as a transaxial overlap area multiplied by an axial overlap length.

10. A method for forward or back projection in computed tomography (CT), the method comprising:
    imaging a subject with a divergent beam source to obtain an image representation of the subject including a plurality of image pixels or voxels; and
    forward projecting the image pixels or voxels onto or back projecting them from a detector array containing a plurality of bins, such that the contribution of a pixel or voxel to detector bin in the forward case or the contribution of a detector bin to a pixel or voxel in the backward case is determined by the intensity value assigned to the pixel or voxel or to the detector bin, respectively, multiplied by the product of an area or volume of overlap and an additional weighting factor, and wherein the area or volume of overlap is determined by overlap of the pixel or voxel with the area or volume illuminated by a ray-wedge defined by the source position and detector bin edge rays, wherein said forward or back projecting comprises projecting or projecting onto a 3D image volume, the area of overlap comprises a volume of overlap, and the weighting factor is multiplied by a volume of overlap, and wherein the volume of overlap is approximated as a transaxial overlap area multiplied by an axial overlap length.

11. The method of claim 1, wherein the divergent source beam comprises a 2D fan beam or 3D cone X-ray beam.

12. A method for reprojection for use in computed tomography (CT), the method comprising:
    imaging with a reference imaging geometry consisting of a 2D fan beam or 3D cone beam source, a plurality of detector elements on a detector array, and at least one given source position to obtain a discrete representation of an image including a plurality of pixels or voxels;

pre-accumulating the image along a first coordinate axis and second coordinate axis directions;

classifying detector edge rays into horizontal and vertical directions for a given source position;

calculating, for a horizontal edge ray set, horizontal cumulative area or volume for each detector edge ray;

differencing, weighting, and accumulating horizontal cumulative areas or volumes and repeating the horizontal cumulative area or volume operations for each image column or column slab;

calculating, for the vertical edge set, the cumulative area or volume for each detector edge ray;

differencing, weighting, and accumulating vertical cumulative areas or volumes for each image row or row slab.

13. A method for backprojection for use in computed tomography (CT), the method comprising:

initializing an image and pre-accumulated temporary images to zero;

classifying detector edge rays into horizontal and vertical directions for each view;

applying a weighting to the value of each detector with an edge ray in the horizontal and vertical groups;

taking a difference of weighted detector values for each detector with a horizontal edge ray, updating all pixels or voxels in a current column or column slab of the image and the pre-accumulated image, and repeating for each image column or column slab;

taking a difference of weighted detectors for each detector with a vertical edge ray, updating all pixels or voxels in a current row or row slab of the image and the pre-accumulated image, and repeating for each image row or row slab;

repeating the classifying, applying and taking of a difference steps to process all detector elements for a given view and then repeating for other views; and reverse accumulating and adding the temporary images to an output image.

* * * * *